April 26, 1966  A. WILLIAMS  3,247,889
LIQUID HEATING AND EVAPORATING APPARATUS
Filed July 17, 1962  4 Sheets-Sheet 1
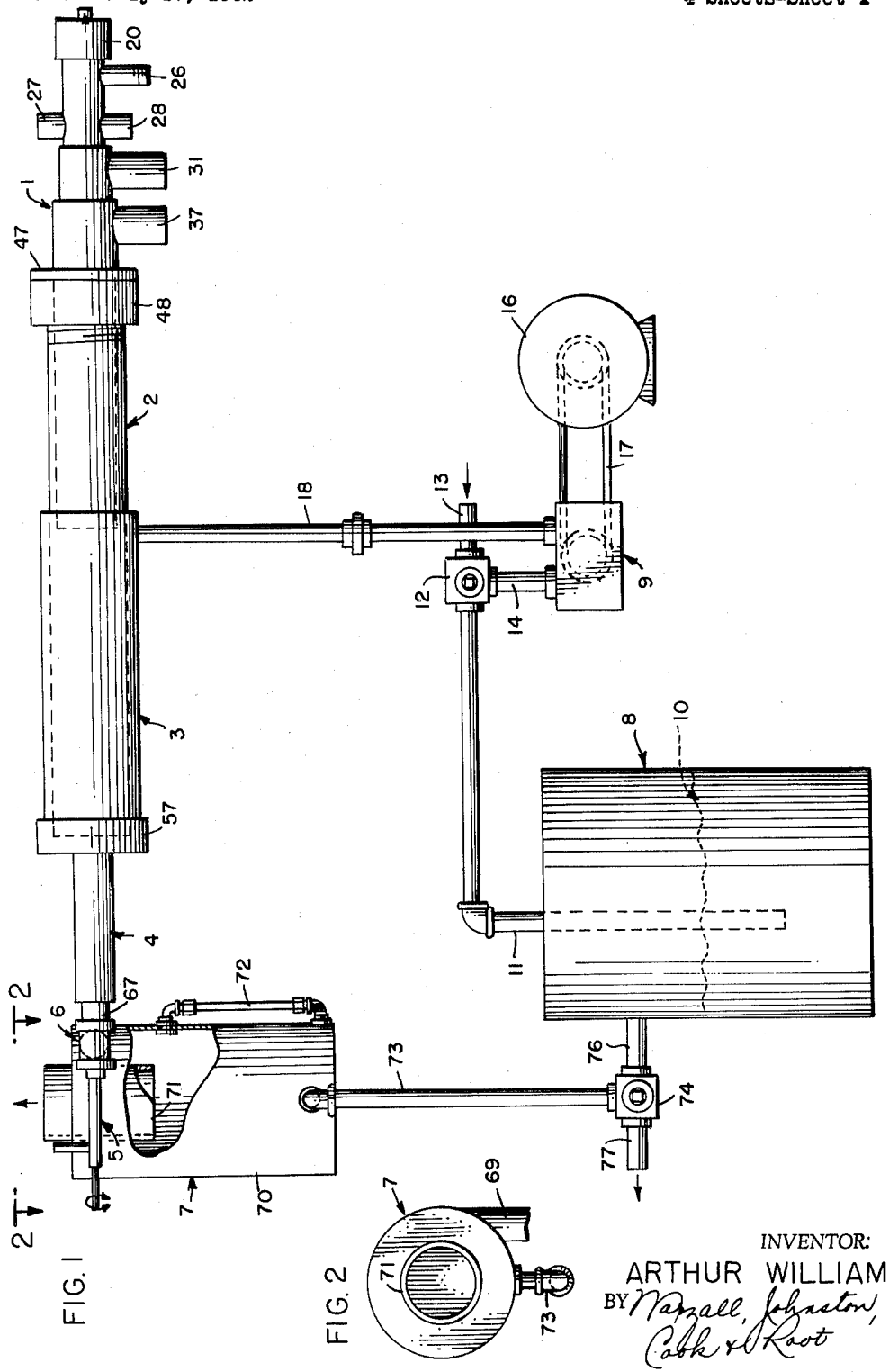
INVENTOR:
ARTHUR WILLIAMS
BY Nazzall, Johnston, Cook & Root
ATT'YS April 26, 1966  A. WILLIAMS  3,247,889
LIQUID HEATING AND EVAPORATING APPARATUS
Filed July 17, 1962  4 Sheets-Sheet 2
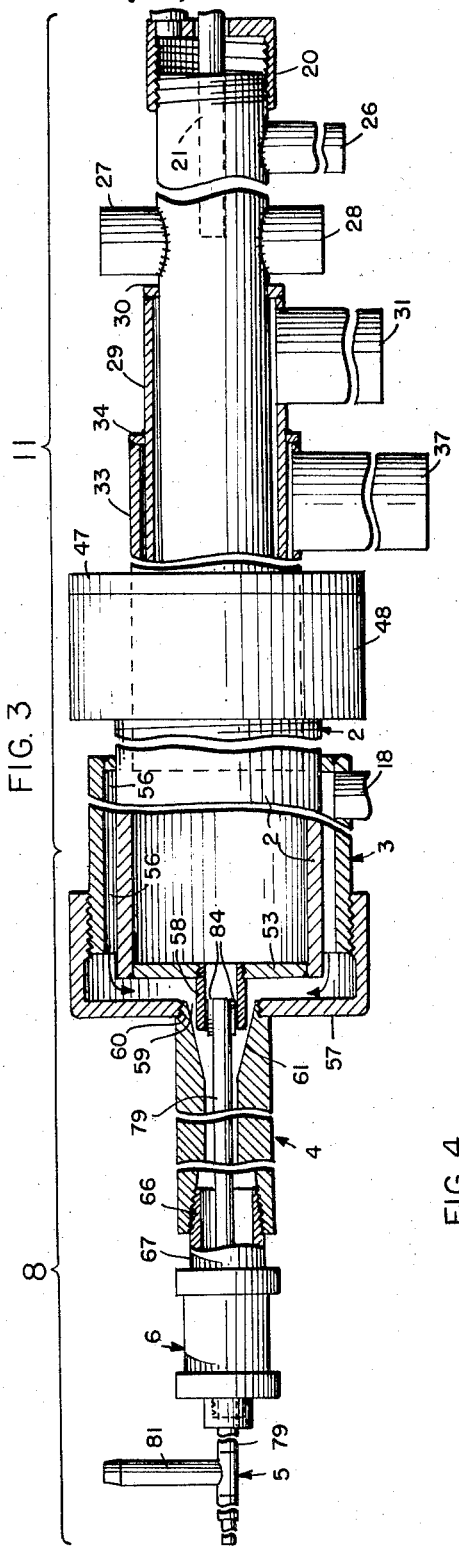
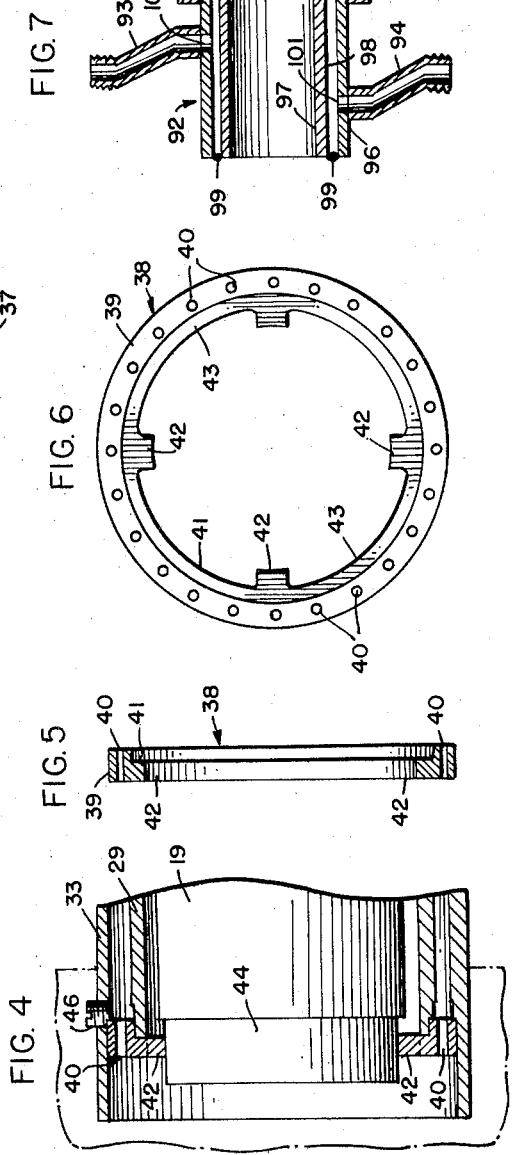
INVENTOR:
ARTHUR WILLIAMS
ATT'YS

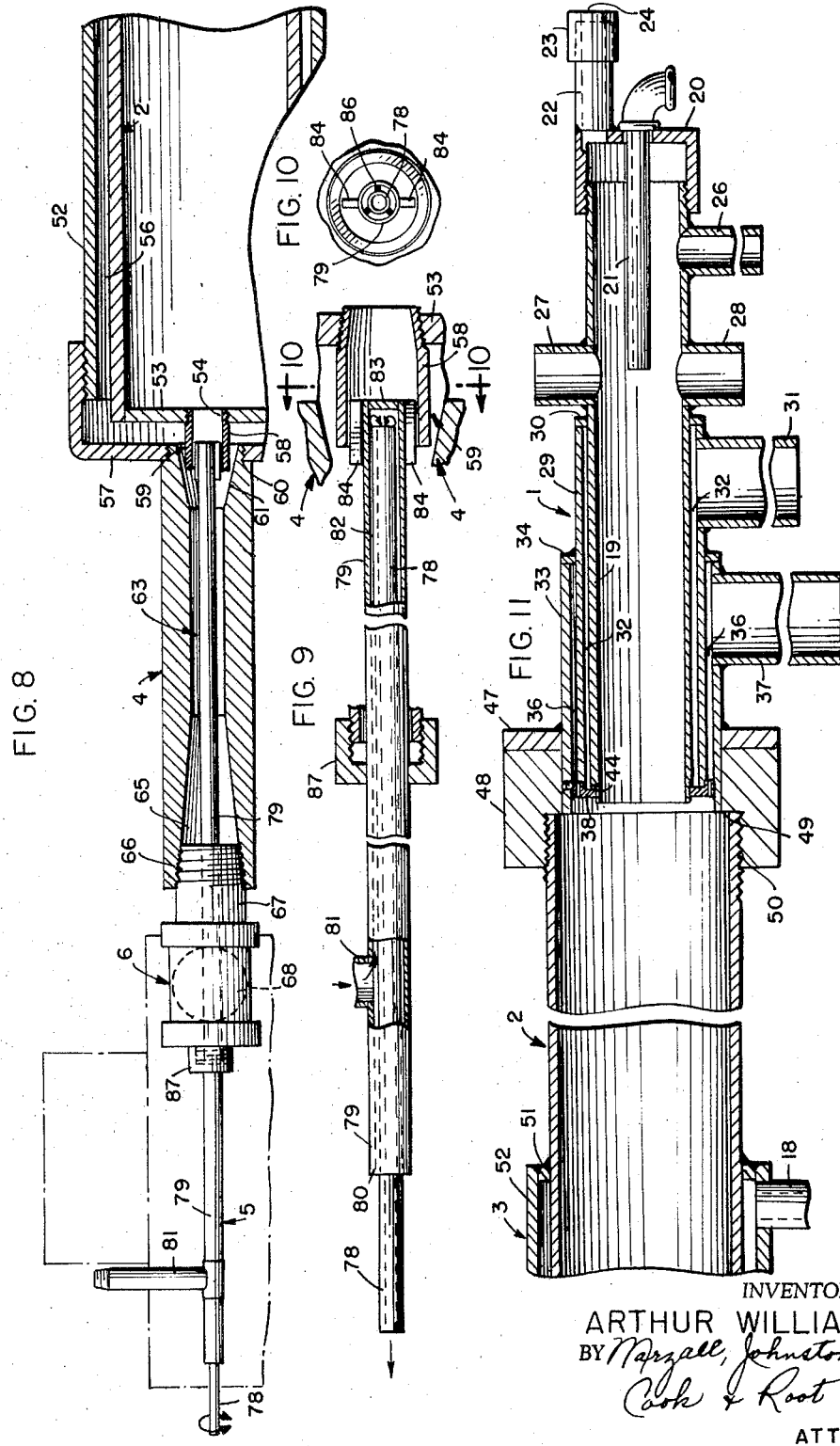

April 26, 1966   A. WILLIAMS   3,247,889
LIQUID HEATING AND EVAPORATING APPARATUS
Filed July 17, 1962   4 Sheets-Sheet 4
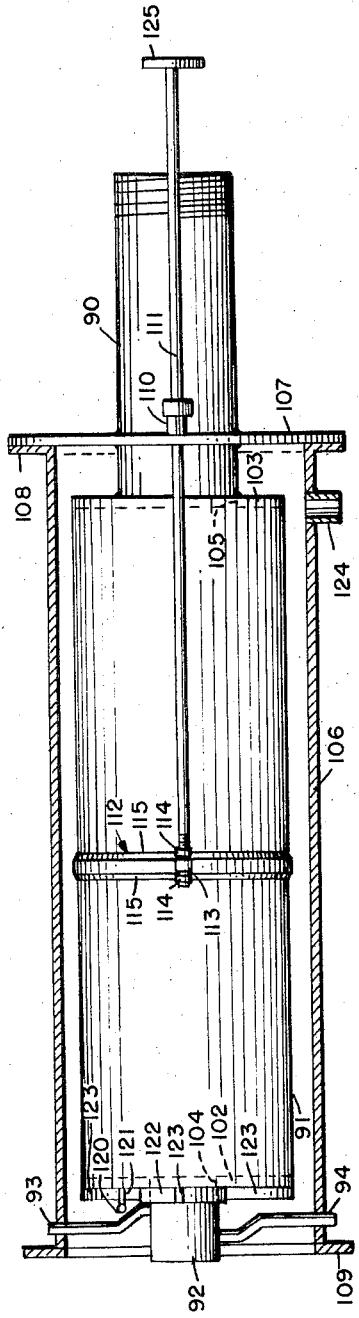
INVENTOR:
ARTHUR WILLIAMS
BY Marzall Johnston,
Cook & Root
ATT'YS

United States Patent Office 3,247,889
Patented Apr. 26, 1966

3,247,889
LIQUID HEATING AND EVAPORATING
APPARATUS
Arthur Williams, Munster, Ind., assignor, by mesne assignments, to Selas Corporation of America, a corporation of Pennsylvania
Filed July 17, 1962, Ser. No. 210,507
6 Claims. (Cl. 159—16)

This invention, in general, relates to the heating of liquids by direct heat exchange between hot gases and a liquid. The invention pertains primarily to apparatus for effecting direct heat exchange between a liquid and hot combustion gases. The apparatus of the invention is especially adapted for the heating of relatively concentrated chemical solutions, particularly solutions of salts having inverse solubility, i.e., salts which become less soluble as the temperature of the liquid increases, and for evaporting or concentrating chemical solutions.

The usual systems for heating a liquid by direct heat exchange with hot gases comprise a vessel or tank in which the liquid is held and the discharge of the hot gases, such as hot combustion gases, is beneath the surface of the liquid. This is known as the submerged combustion principle of heating. These heating systems operate with relatively good success in chemical plant installations, although some operating problems have been encountered with the submerged combustion heating of chemical solutions. For example, when submerged combustion is used in a vessel or tank to heat the solution therein, the heating operation is inevitably accompanied by agitation of the solution. In some instances this agitation is not sufficiently violent to create a problem.

For example, in the heating of pickling liquors by submerged combustion, it is usually found that the relatively small amount of agitation resulting from the discharge of the hot gases into the body of the pickling liquor was accompanied by a marked increase in the speed of pickling and with a controllable amount of agitation. The quantity of combustion gases discharged into the pickling liquor was an amount providing an average heat release of about 10,000 B.t.u./sq. ft.

Where, however, the heating requirements are substantially above this B.t.u./sq. ft. figure, as in many chemical installations wherein average heat release is in the order of 100,000 B.t.u/sq. ft., there is a substantial increase in agitation of the chemical solution. When heating or evaporating solutions, the agitation is not helpful and, in fact, often is detrimental. Some trouble has been experienced in lighting the submerged burner, and at times the chemical solution has washed back into the combustion chamber of the submerged burner. Also, there are always problems with entrainment and carryover of liquid in the combustion gases exiting from the heating or evaporating vessel. These problems have been, in part, overcome by the use of perforated plates, large vessels having a relatively large free head above the liquid surface, and sections or segments of the apparatus in which the gas discharge flow is of a relatively low velocity. For the most part, however, these structures are only partially remedial of the problem, are expensive, and often are space-consuming.

This invention provides a different approach from the submerged combustion principle for the heating of a liquid by direct heat exchange with hot gases. The heating system of the invention utilizes a circulatory system for circulating the liquid to be heated from a holding vessel through a heat exchange system in which the liquid and hot gases are brought into direct contact and thereafter separated, after which the liquid so-heated is returned to the holding vessel. In the preferred practice of the invention, the liquid to be heated is first conducted in indirect heat exchange with the hot gases, after which it is injected in the form of a narrow stream into the stream of hot gases. This system provides excellent heat transfer from the hot gases to the liquid. It also can be constructed so as to provide large heating capacities for chemical solutions without the attendant disadvantages of submerged combustion systems heretofore discussed.

Furthermore, these systems can be used successfully in the heating of solutions of salts of inverse solubility by the provision of means to prevent deposits of the inversely soluble salts on hot surfaces of the apparatus or by means for scraping or otherwise removing deposited salts during the operation of the unit.

It is, accordingly, a primary object of the invention to provide improvements in the heating of liquids by direct heat exchange between hot gases and the liquid.

A further object of the invention is to provide heating apparatus of the aforesaid character with high heat transfer capacity.

A further object of the invention is to provide a circulatory system for effecting direct heat exchange between a liquid and hot combustion gases.

Still another object of the invention is to provide a direct heat exchange system for liquids and hot gases employing an injection principle for bringing the hot gases and the liquid into heat exchange contact.

Still another object of the invention is to provide heating apparatus especially adapted for the heating of solutions of salts having inverse solubility.

Still another object is to provide improvements in a heating system for preventing and/or removing, during the operation of the unit, salt build-up on hot surfaces of the unit.

Still another object of the invention is to provide improvements in scraper structures for removing salt deposits on hot surfaces of heat exchange apparatus for heating chemical solutions.

The foregoing and numerous other important objects, advantages, and inherent functions of the invention will become apparent as the same is more fully understood from the following description, which, taken in connection with the accompanying drawings, discloses a preferred embodiment of the invention.

In the drawing:

FIG. 1 is a side elevation of one embodiment of the heating apparatus of the invention;

FIG. 2 is a top plan view of the separator of the apparatus of FIG. 1;

FIG. 3 is a broken view, partly in cross-section, of the burner, combustion tube jacket, injector and salt deposit breaker of the embodiment of FIG. 1;

FIG. 4 is a fragmentary view in section of an enlargement of the burner of FIG. 1 at the burner plate;

FIG. 5 is a diametric cross-section of the burner plate for the burner of FIG. 1;

FIG. 6 is an end elevation of said burner plate;

FIG. 7 is a view in cross-section of a jacketed gas nozzle and illustrates the combustion gas nozzle used in the embodiments of FIGS. 12 and 13, which nozzle may be also used in the embodiment of FIGS. 1 through 11 in lieu of the nozzle therein shown;

FIG. 8 is a fragmentary view, partly in cross-section, of the downstream side of the jacket of FIG. 3 with the injector and salt deposit breaker or scraper mounted thereon;

FIG. 9 is a detailed view, partly in cross-section, of the jacketed breaker or scraper;

FIG. 10 is a section taken on section 10—10 of FIG. 9;

FIG. 11 is a cross-sectional view of the burner, combustion chamber and a fragment of the jacket of FIG. 1;

FIG. 12 is a sectional view of an alternative form of the jacket of FIG. 1; and

FIG. 13 is an end elevation of the jacket of FIG. 12.

Referring to the drawings, there is shown in FIG. 1 a complete heating system of the invention in which the hot gasses are provided by a burner 1 having on its downstream side a combustion chamber 2. The hot combustion gases are discharged into a jacket 3. These gases pass through the inner shell of the jacket, while the liquid to be heated is circulated between the inner and outer shells of the jacket. The gases flowing through the inner shell of the jacket 3 are discharged into the venturi tube 4 while the liquid flowing between the two shells is injected in a concurrent direction into the venturi tube whereby a stream or streams of liquid and the hot gases come into direct, heat exchange relationship.

One end of a scraper or breaker 5 projects from the downstream side of the venturi tube 4. This breaker is described in detail hereafter.

The combustion gases and liquid injected therein flow through the T 6 into the separator 7.

The separator 7 has a cylindrical shell into which the liquid-gas stream is discharged tangentially with respect to the cylindrical shell. The liquid and gases separate, and the gases are vented while the liquid is returned to the holding tank 8.

The liquid in the tank 8 is recirculated through the apparatus until it has reached the desired temperature, solids concentration, or the like by means of a pump 9. The body of liquid 10 in the tank 8 is drawn via pipe 11 and two-way T-valve 12 and coupling pipe 14 to the inlet side of the pump 9. The pump is driven by a prime mover such as a motor 16 connected to the pump by a chain or belt drive 17. The discharge side of the pump 9 is connected via pipe 18 to the jacket 3.

The two-way, T-valve 12 also has connected therewith a pipe 13 through which rinse water or solution can be admitted to the system by selective positioning of the valve 12. This rinse water or solution is pumped through the system in the same manner as the solution from the tank 8. The rinse water or solution, however, usually is not returned to the tank 8 after passing through the system, but rather is discharged through the pipe 77 connected to the two-way, T-valve 74.

The burner 1 comprises central tube 19 capped on one end by the cap 20. A pilot gas tube 21 extends into the tube 19 through the cap 20. The cap 20 may also carry a sight tube 22 having on its outer end a cap 23 in which is mounted a sight glass 24. The sight tube 22 allows the observation of the combustion of the gases in the burner 1.

The center tube 19 has extending radially therefrom and communicating therewith a tube 26 through which air or other combustion supporting gas is admitted to the center, pilot tube 19. The latter also has opposing, radially extending tube segments 27, 28. One of these tubes may be used as a sight tube, the cap of which is not shown. The other tube is used for providing in the pilot tube 19 a spark-type or hot wire igniter (not shown) for igniting the gas mixture in pilot tube 19.

There is mounted about a portion of the pilot tube 19 a concentric tube 29 forming an annular space between the outer side of the tube 19 and the inner side of the tube 29. One end of this space is closed off by a ring 30 welded to the end of the tube 29 and to the outer side of the tube 19. The tube 29 has a radially extending pipe or tube 31 mounted therein and communicating with the annular space 32 between tubes 19 and 29. In the illustrated case, the pipe or tube 31 is used for supplying air, oxygen, or other combustion supporting gas to the annular space 32.

There is provided about a portion of the tube 29 a second, outer, concentric tube 33 forming an annular space between the tube 29 and tube 33, one end of which is closed off by the ring 34 welded to the end tube 33 and the outer side of the tube 29. A combustible gas is admitted to the space 36 between the latter tubes through the gas in the pipe 37 which is mounted in and extends radially from the tube 33. The annular spaces 32 and 36 form, respectively, the combustion supporting and combustible gas conveying passages for the main burner, which is positioned concentrically about the pilot tube 19. The downstream side of these passages is provided with a burner plate 38, which comprises a ring part 39 having a plurality of gas ports 40 therein. The combustible gas flowing through the passages 36 is discharged through these ports 40.

The burner plate 38 also has an inwardly extending flange 41 having four inwardly extending ears 42. The spaces 43 between the ears 42 form curved slots between the inner edge of the flange 41 and the reduced end 44 of the pilot tube 19. The inner edges of the ears 42 rest on this reduced end when the burner plate is mounted in the burner and held in position by the set screw 46. The aforesaid curved slots form the ports for the combustion supporting gas flowing through the passage 36 of the burner 1, which combustion supporting gas mixes with the combustible gas issuing from the ports 40 to form the main burner flame at the burner plate 38.

The outer tube 33 has welded thereon a mounting ring 47 to which is welded a ring block 48. The end of the ring block 48 has a cylindrical recess 49 in which is threaded by threads 50, the upstream end of the combustion tube 2. The gases from the burner 1 mix, ignite and burn in the combustion tube 2.

The jacket 3 is formed by providing a cylindrical shell 52 about the combustion tube 2 with an annular space between these tubes. One end of this annular space is closed off by a ring 51 welded to the end of the tube 52 and the outside of the combustion tube 2. The downstream end of the combustion tube 2 has a ring-shaped end wall 53 having a central opening or port 54 through which the burned gases are discharged from the combustion tube.

The liquid or solution to be heated is pumped via the pipe 18 into the annular, liquid circulation passage 56 formed between the combustion tube 2 and the outer tube 52 of the jacket 3. This liquid flows from the rearward end of the passage 56 toward the forward or downstream end and is heated by contact with the hot wall of the combustion tube 2. The downstream end of the jacket 3 is capped by a cap 57 threaded on the downstream end of tube 52. The burned gases are discharged from the combustion tube 2 through the gas outlet nozzle 58 threaded in the end wall 53 of the combustion tube 2. The venturi tube 4, which is threadedly connected at 60 to the cap 57, has a conical upstream passage 59 of slightly larger diameter than the outer diameter of the nozzle 58 so as to form a narrow, annular, tapered passage by which the liquid flowing through the jacket 3 and through the space between the cap 57 and the end wall 53 is discharged into the venturi tube 4 at high velocity. The liquid flowing through this annular passage is injected into the burned gases flowing out the nozzle 58 in the tapering, upstream portion 61 of the passage 59 in the venturi tube 4. The liquid-gas stream flows through the passage 63 and is discharged from the venturi tube 4 through the flaring segment 65 of passage 63 into the union 67, which is threadedly connected at 66 with the downstream end of the venturi tube 4. The passage 63 has a Venturi-type shape, which has proven to be advantageous in the practice of the invention. The tapering portion 61 has a greater taper, e.g., twenty degrees than the flaring portion 65, e.g., seven degrees.

The liquid-gas mixture undergoes direct heat transfer from the hot, burned gases to the liquid injected therein in the venturi tube 4. The mixture flows from the union 67 into the T-coupling 6 and exits from this coupling via the T-outlet 68. The outlet 68 is connected with a pipe 69 (FIG. 2) which communicates with the upper portion the burned gases to a temperature higher than the temperature of the solution circulating through the jacket. Therefore, there may be provided on the apparatus of FIGS. 12 and 13 a scraper for scraping the outer surface of the end wall 102.

For the latter scraping function, there may be provided a pair of aligned tubes 116, 117 mounted in a cylindrical wall of the outer shell 106. The outer end of the tube 116 is closed off by a sealing cap 118 while the outer end of the tube 117 carries a packing gland 119.

A reciprocable rod or tube 120 extends through the tube 117 and the outer shell 106 into the tube 116. The tubes 116 and 117 provide a sliding support for the rod or tube 120 whereby the rod or tube can be reciprocated in the tubes 116, 117. The rod or tube 120 carries at its mid-portion a pair of spaced pins 121 positioned on opposite sides of the uppermost one of the four scraper blades 123. The scraper blades 123 are mounted on and extend radially from the ring-shaped scraper hub 122 which is rotatably supported about the inner end of the nozzle 92. These scraper blades 123 are in scraping contact with the outer side of the end wall 102.

When the tube or rod 120 is reciprocated, one or the other of the pins 121 presses against the side of the uppermost scraper blade 123, causing the scraper unit to rotate. By reciprocating the rod or tube 120, e.g., manually by means of the handle 126, the scraper unit oscillates through an arc of 90° or slightly more so that the end wall 103 is scraped by the four scraper blades 123, thus removing any solids deposited on the end wall 102.

When the jacket of FIGS. 12 and 13 is mounted in the liquid heating system of the character illustrated in FIG. 1, the liquid or chemical solution to be heated is admitted to the annular space between the inner and outer shells through the tube 124, which is coupled to the pipe 18 shown in FIG. 1. The liquid thus circulates in heat exchange relationship with the combustion chamber 91, which is heated by the burned combustion gases flowing therethrough. The liquid flows through the jacket and is discharged through an annular space about the gas exit nozzle 92 into a venturi tube of the character of venturi tube 4 in the first described embodiment of the invention. The liquid or solution is further heated by direct contact between the hot gases and the injected liquid in the venturi tube 4 in the manner previously described with respect to the aforesaid embodiment and the liquid-gas mixture is separated in the manner previously described.

Therefore, the apparatus of this invention comprises a burner and burner adapter of any suitable design for supplying hot combustion gases which flow through the combustion chamber. The liquid or solution to be heated or evaporated is pumped through the space between the combustion chamber and the outer shell of the jacket. The combustion gases are discharged from the combustion chamber through a gas exit nozzle, and the liquid or solution flowing through the jacket is forced through an annulus about the gas exit nozzle. The hot gases and the liquid or solution enter a venturi tube where evaporation and/or heating by direct heat exchange between the gases and the liquid takes place. The gases exit through the nozzle at high velocity, and the solution entering the venturi tube through the annulus has an appreciable velocity so that the mixture in the venturi tube throat has an appreciable amount of kinetic energy. The expanding portion of the venturi tube downstream of the venturi tube throat converts part of this kinetic energy into a pressure increase to reduce the over-all pressure drop in the system. There is also a pressure recovery attributable to the cooling of the gases after they leave the gas exit nozzle. The mixture of liquid or solution and gases enter the separator, from which the solution is returned to a holding vessel and the gases are exhausted to the atmosphere or to apparatus in which their residual heat is recovered. The circulating pump draws the solution from the holding vessel and pumps it to the jacket to complete the cycle of operation.

One of the major advantages of the apparatus of the invention is that the quantity of solution which can be circulated is substantial in relation to the quantity of gases burned by the unit. For example, with a gas input sufficient to provide a heating input to the unit of 60,000 B.t.u./hr., the heated solution discharged from the separator may range from 500 to 1,000 lbs./hr. The weight of the dry gases discharged from the separator stack at this heat input, is about 43 lbs./hr., with which dry gases there is discharged about 6 lbs./hr. of water vapor produced by the combustion and about 47 lbs. per hr. of water vapor resulting from the evaporation of the solution.

There are many other advantages of the system of the invention. For example, there is no danger that the solution will back up into the burner or igniter, which danger is present with conventional type submerged combustion burners. The relatively large volume of liquid circulating through the injector and the separator minimizes solution entrainment losses in the discharge gases. The relatively large volume of liquid absorbs the fine particles of solution in the liquid-gas mixture, and the large mass of liquid can be efficiently separated from the gases.

The holding vessel which holds the liquid or solution to be circulated can be of any desired size, regardless of the heat output of the burner of the system. If desired, the separator can be built large enough so that the bottom portion thereof is used for storage volume of the liquid, thereby eliminating the need for a separate holding vessel. The heating apparatus of the invention can be used in conjunction with a crystallizer vessel.

While the apparatus of the invention can be cleaned easily by circulating a wash liquid therethrough in the manner heretofore described, there will inevitably be deposits on hot surfaces of the apparatus when it is used for the evaporation of solutions of salts of inverse solubility. The previously described valve arrangement, by which the holding vessel can be isolated from the system while the system is washed with water or acid or other chemical solution, may be made to operate automatically in response to the circulating pump pressure, which will build up if the solution entrance to the injector becomes partially blocked. Such cleaning can be done with practically no dilution of the saturated solution being heated or evaporated.

With solutions of salts of inverse solubility there is a greater tendency toward solids deposit and build up on combustion chamber nozzles or ports because these surfaces are heated by the hot gases and also come into contact with the solution being circulated through the system. The same applies to the outer wall of the combustion chamber. This invention solves the problem of solids deposit build up by liquid cooling of these hot surfaces through the circulation of a cooling liquid in sufficient quantity to hold the temperature of the surface at or preferably below the temperature of the solution being circulated and/or by the provision of scrapers which may be operated continuously or intermittently to remove the deposited solids. In some instances, as is the case with the scraper for the gas nozzle, it is necessary to cool the scraper and its drive member by the circulation of a cooling liquid therethrough to prevent solids build up on the scraper or its drive member. Therefore, the invention provides the solution of the problem regarding the build up of solids deposits on surfaces of the system which are heated above the temperature of the solution being circulated, particularly in the case of solutions of salts of inverse solubility, by one or more of three different techniques—by flushing the system with a washing liquid, by scraping the surface on which solids build up occurs, or by liquid cooling of surfaces heated by the hot gases in maintaining these surfaces at a temperature of the cylindrical shell 70 of the separator 7. The liquid-gas stream flows tangentially into the shell 70 and the liquid and gas are separated by centrifugal force. The gas portion of the mixture is vented from the separator 7 via the outlet tube 71 provided in the upper portion of the separator 7. The liquid portion of the mixture collects in the bottom of the separator 7, and its level can be ascertained by the liquid level in the glass sight tube 72 mounted on the shell 70 by conventional couplings.

Collected liquid from the separator 7 flows by gravity through the pipe 73 to the two-way, T-valve 74. It is returned to the vessel 8 via the pipe 76. The T-valve 74 also has a drain pipe 77 which, upon selective positioning of the valvve 74, may be used to drain the system or to discharge wash water or solution instead of returning it to the tank 8. Thus, the T-valves 12 and 74 can be used to rinse the entire liquid circulatory system without discharging the rinse liquid into the tank 8.

The scraper or breaker 5 comprises a tube 78 adapted to be oscillated by means not shown. A second tube 79 is welded or otherwise attached to the tube 78 and has an internal diameter larger than the external diameter of tube 78 so as to form an annular space between the tubes. The end 80 between these tubess is closed to prevent escape of liquid, which is supplied to the annular space between the tubes via pipe 81 mounted on and communicating with the outer tube 79. The pipe 81 is connected to a source of water or other coolant liquid by a hose or other flexible tubing which will allow the pipe 81 to oscillate with the tubes 78, 79. The coolant liquid supplied through the pipe 81 flows through the annular passage 82 between the tubes in order to maintain the portion of the outer tube 79 which is inside the T-coupling 6 and the venturi tube 4 at a relatively low temperature. This coolant liquid is used to keep the latter portion of the tube 79 at a temperature below that at which solids would tend to build up on the tube 79 from solutions injected into the venturi tube 4, which solutions are solutions of salts of inverse solubility which tend to deposit or crystallize out on surfaces hotter than the temperature of the solution. The coolant liquid is blocked against flow into the nozzle 58 by the plate 83 mounted in the end of the tube 79. It returns via the tube 78 and is discharged to waste or to the cooling system for ultimate recirculation.

The scraping function of the liquid-cooled scraper or breaker 5 is accomplished by the scraper blades 84 mounted on and extending radially from the tube 79. These scraper blades scrape the inner wall of the gas discharge nozzle 58 and prevent a solids build up at this point. It has been discovered that this is a critical point in the apparatus of the invention at which there is a tendency towards solids build up by deposition or crystallization from solutions of salts having inverse solubility.

The tubes 78 and 79 are maintained in their concentric, spaced relationship by spacers 86 (FIG. 10). The tube 79 is journalled for oscillating movement in the packing gland 87 of the T-coupling 6.

There is shown in FIGS. 12 and 13 an alternate embodiment of the invention pertaining to the structure of the jacket 3 in the combination disclosed in FIGS. 1 through 6 and 8 through 11. In this embodiment, there is shown a burner adapter 90 on which may be mounted the burner 1 of the previously described embodiment or any other burner of suitable construction. There is mounted on the downstream end of the burner adapter 90, the combustion chamber 91. The downstream end of the combustion chamber 91 has a gas exit nozzle 92. This nozzle 92 is a liquid cooled nozzle, the structural detail of which is shown in FIG. 7. The nozzle 92 has a pair of tubes 93, 94 mounted on the outer shell 96 of the nozzle. The outer shell 96 is a cylindrical shell mounted concentrically about and spaced from a cylindrical inner shell 97 to provide an annular space 98 between the shells. The ends of the shells 96, 97 have a welding, beading or other means 99 extending therebetween to close off the ends of the annular space 98. This structure provides a jacket about the nozzle 92 so that liquid can be circulated through the annular space 98 to cool the cylindrical wall of the inner shell 97 through which the burned combustion gases flow. The circulating liquid coolant also cools the outer wall of the outer shell 96 around which the liquid being circulated flows as it passes from the jacket into the injector.

The cooling of the wall of the inner shell 97 is done for the purpose of preventing a build up of salts of inverse solubility on the inner wall of tthe shell 97. The jacketed nozzle 92, therefore, may be used in lieu of the nozzle 58 and its associated scraper structure 5 or in the embodiment of FIGS. 1–6 and 8–11, or if desired, the gas exit nozzle 92 may be provided with a scraper similar to the scraper structure 5 shown in the aforesaid embodiment.

The liquid coolant may be admitted, for example, to the jacketed nozzle 92 via the tube 93. The liquid flows through the port 100 in the outer shell 96, circulates in the annular space 98, and is discharged from the jacketed nozzle through the port 101 in the outer shell 96, which port 101 communicates with the coolant discharge tube 94. The quantity of coolant liquid circulated through the jacketed nozzle 92 is sufficient to prevent a solids build up on the inner wall of the shell 97 and the outer wall of the shell 96 by keeping their temperatures low enough.

The nozzle 92 is mounted in the ring-shaped end wall 102 of the combustion chamber 91 and has an opening 104 communicating the gas exit passage of the nozzle 92 with the interior of the combustion chamber 91. The burner adapter 90, likewise, is mounted on the ring-shaped end wall 103 of the combustion chamber 91 and has an opening 105 communicating the burner adapter 90 and the interior of the combustion chamber 91.

The combustion chamber 91 is surrounded by a cylindrical outer shell 106. The inner diameter of the shell 106 is greater than the outer diameter of the combustion chamber 91 so as to provide an annular space between the shells through which liquid may flow. The burner adapter 90 has welded to its outer wall a ring plate 107 to which is bolted, welded or otherwise fixedly attached the flange 108 of the outer shell 106. The opposite end of the outer shell 106 has a flange 109 to which may be bolted a plate or other structure supporting an injector of the character described with regard to the previously disclosed embodiment.

There is mounted on the ring plate 107 at diametrically opposite points a pair of packing glands 110, one of which is shown in FIG. 12. Each packing gland 110 has slidably mounted therein a slide rod 111. The packing gland prevents the escape of liquid from the outer shell 106 through the opening in the ring plate 107 about the rod 111.

The ends of the slide rods 111 inside the jacket are each attached to an ear 113 of a scraper ring 112 by nuts 114 threaded on the threaded end of the rods 111. The scraper ring 112 has scraping edges 115 in contact with the outer cylindrical wall of the combustion chamber 91. When the scraper ring 112 is reciprocated by pushing and pulling the rods 111, the scraper edges 115 remove any solids deposited from the circulating solution in the jacket on the outer cylindrical wall of the combustion chamber 91. The rods 111 may be reciprocated manually, each rod 111 having a handle 125 provided for this purpose. The scraping of the combustion chamber 91 needs to be done only periodically in most instances. It is within the contemplation of the invention, however, to provide a conventional reciprocating mechanism by which the rods 111 and the scraper ring 112 are power reciprocated.

The end wall 102 of the combustion chamber 91 is another surface of potential solids deposit from solutions of salts of inverse solubility. Like the cylindrical wall of the combustion chamber 91, this end wall is heated by the same as or preferably below the temperature of the solution being circulated.

The invention is especially valuable in making it possible to eliminate large tanks in heating, evaporating and concentrating equipment. It is also very valuable in making it possible to operate heating equipment of the type described at lower back pressure than normally involved in conventional submerged combustion equipment. For example, a system of the type described herein can be operated at 3 pounds per square inch (gauge) back air pressure whereas 6 to 8 pounds per square inch back air pressure would represent operating conditions in a conventional system using submerged combustion. Less costly auxiliary equipment is therefore required in the practice of this invention.

The invention is subject to some variation. For example, the burner fuel such as gas can be introduced into the burner through pipe 31 and the combustion supporting fluid such as air can be introduced through pipe 37, in which case the burner plate shown in FIGURE 6 would be modified so that the holes 40 were at the end of passageway 32. The invention in its broader aspects is not limited to the use of burners that have heretofore been employed as submerged burners. Other types of burners can be used. The fuel employed can be a combustible gas, oil, powdered fuel, or other gaseous, liquid or solid state fuel or mixtures thereof. Hot burned gases or exhaust gases from some other source than a burner can be used.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. An apparatus for thermal treatment of a liquid comprising means for supplying hot gases, a shell forming a chamber adapted to receive and convey therethrough said hot gases, a gas exit nozzle at the downstream end of said chamber, a venturi tube having a passageway with a converging, upstream portion and a flaring downstream portion, said gas exit nozzle projecting into said upstream portion, means to supply liquid to said upstream portion of said passageway about the downstream end of said nozzle, thereby injecting liquid into the hot gas stream flowing through said passageway, separator means communicated with the other end of said passageway for separating the resultant liquid-gas mixture into a liquid phase and a gas phase, a drive shaft extending through said passageway, means for circulating a cooling liquid through said drive shaft for cooling said shaft, and scraper means on said drive shaft in contact with a wall of said nozzle for scraping deposited material from a wall of said nozzle.

2. An apparatus as claimed in claim 1 wherein said drive shaft comprises a rotatably journalled pair of concentric tubes forming an annular passageway therebetween, said scraper means comprises radial scraper blades mounted on one end of said shaft, said radial scraper blades being in scraping contact with the inner wall of said gas exit nozzle, and means on said pair of concentric tubes directing said circulation of cooling liquid through said shaft via said annular passageway and the inner one of said tubes.

3. An apparatus for thermal treatment of a liquid comprising means for supplying hot gases, a shell forming a chamber adapted to receive and convey therethrough said hot gases, a gas exit nozzle at the downstream end of said chamber, a tube defining a passageway communicating at one end thereof with said gas exit nozzle, a second shell about said chamber forming an annular, liquid-conveying passageway between said shell and said chamber, means for conveying a liquid flowing through said annular passageway from said annular passageway to said first-mentioned passageway, scraper means in said annular passageway and mounted about the outer wall of said first-mentioned shell for scraping said outer wall, means operatively connected to said scraper means for reciprocating said scraper means longitudinally in said annular passageway, and separator means communicated with the other end of said first-mentioned passageway for separating the resultant liquid-gas mixture into a liquid phase and a gas phase.

4. An apparatus for thermal treatment of a liquid comprising means for supplying hot gases, a shell forming a chamber adapted to receive and convey therethrough said hot gases, an end wall on the downstream end of said shell, a gas exit nozzle mounted on said end wall substantially centrally thereof, a tube defining a passageway communicating at one end thereof with said gas exit nozzle, a second shell about and spaced from said first shell to define an annular liquid passageway therebetween, an end wall on said second shell spaced from said end wall on said first shell and defining a liquid passageway communicating with said annular passageway, said tube also defining means about said gas exit nozzle for discharging liquid flowing through said two last-mentioned passageways into said first-mentioned passageway, scraper means having scraper blades in scraping contact with the side of said end wall of said chamber immediately opposite said end wall of said second shell, means for rotating said scraper means, and separator means communicated with the other end of said first-mentioned passageway for separating the resultant liquid-gas mixture into a liquid phase and a gas phase.

5. An apparatus for thermal treatment of a liquid comprising a burner for burning a fuel to provide hot gases, a shell forming a chamber on said burner to receive and convey therethrough said hot gases, an end wall on the downstream end of said chamber, a hot gas exit nozzle mounted in said end wall and projecting in a downstream direction from said end wall, a tube defining a venturi passageway having a tapering, conical, upstream portion and a flaring, conical, downstream portion, said gas exit nozzle extending into said tapering portion with the downstream end of said nozzle spaced from said tapering portion, a second shell mounted about and spaced from said first-mentioned shell and forming an annular fluid passageway between said shells, and means communicating said annular fluid passageway and the space between said downstream end of said gas exit nozzle and said tapering portion whereby fluid may be passed through said annular passageway and into said tapering portion of said venturi passageway.

6. An apparatus as claimed in claim 5 wherein said last-mentioned means is a cap mounted on the downstream end of said second shell in spaced relation to said end wall, said cap having an aperture through which projects said gas exit nozzle, and means securing the upstream end of said tube to said cap with said aperture in said cap communicating with said tapering, upstream portion of said tube.

References Cited by the Examiner

UNITED STATES PATENTS

| 517,297 | 3/1894 | Reiss | 126—360 X |
| 782,632 | 2/1905 | Waldbaur | 126—350 |
| 1,668,504 | 5/1928 | Hammond. | |
| 1,689,551 | 10/1928 | Hammond. | |
| 2,017,031 | 10/1935 | Stratton | 261—76 X |
| 2,040,223 | 5/1936 | Tullis. | |
| 2,327,039 | 8/1943 | Heath | 126—350 X |
| 2,344,758 | 3/1944 | Welsh. | |
| 2,395,483 | 2/1946 | James | 239—117 |

(Other references on following page)

References Cited by the Examiner

| | | |
|---|---|---|
| 2,506,853 | 5/1950 | Berg et al. |
| 2,530,270 | 11/1950 | Swindin. |
| 2,538,412 | 1/1951 | Cecil et al. |
| 2,770,295 | 11/1956 | Allen ---------------- 159—16 |
| 2,810,434 | 10/1957 | Bramming. |
| 2,834,409 | 5/1958 | Peterson -------------- 159—16 |
| 3,073,534 | 1/1963 | Hampshire ---------- 239—422 |
| 3,104,947 | 9/1963 | Switzer et al. -------- 159—16 |

FOREIGN PATENTS 341,559   1/1931   Great Britain.

NORMAN YUDKOFF, *Primary Examiner.*

PERCY L. PATRICK, *Examiner.*